US012586975B2

(12) United States Patent
Kawakami et al.

(10) Patent No.: US 12,586,975 B2
(45) Date of Patent: Mar. 24, 2026

(54) EXCITATION DEVICE FOR OPTICAL AMPLIFIER

(71) Applicant: NTT, Inc., Tokyo (JP)

(72) Inventors: Hiroto Kawakami, Musashino (JP);
Shoichiro Kuwahara, Musashino (JP);
Yoshiaki Kisaka, Musashino (JP)

(73) Assignee: NTT, Inc., Tokyo (JP)

( * ) Notice: Subject to any disclaimer, the term of this
patent is extended or adjusted under 35
U.S.C. 154(b) by 612 days.

(21) Appl. No.: 18/021,889

(22) PCT Filed: Aug. 25, 2020

(86) PCT No.: PCT/JP2020/031993
§ 371 (c)(1),
(2) Date: Feb. 17, 2023

(87) PCT Pub. No.: WO2022/044113
PCT Pub. Date: Mar. 3, 2022

(65) Prior Publication Data
US 2024/0039233 A1 Feb. 1, 2024

(51) Int. Cl.
*H01S 3/094* (2006.01)
*G02B 27/28* (2006.01)
(Continued)

(52) U.S. Cl.
CPC ...... *H01S 3/094011* (2013.01); *G02B 27/283*
(2013.01); *H01S 3/06754* (2013.01);
(Continued)

(58) Field of Classification Search
CPC ........... H01S 3/094011; H01S 3/06754; H01S
3/094053; H01S 3/094076; H01S 3/302;
(Continued)

(56) References Cited

U.S. PATENT DOCUMENTS 6,137,925 A * 10/2000 Stimple ................. G02F 1/0136
385/11
6,163,636 A 12/2000 Stentz et al.
(Continued)

FOREIGN PATENT DOCUMENTS

JP 2000-214503 A 8/2000
JP 2003-315739 A 11/2003
(Continued)

OTHER PUBLICATIONS

T. Kobayashi et al., "PDM-16QAM WDM Transmission with
2nd-Order Forward-Pumped Distributed Raman Amplification Uti-
lizing Incoherent Pumping", Optical Fiber Communications Con-
ference and Exhibition (OFC), Tu3F.6 (2019).

*Primary Examiner* — Kristy A Haupt
(74) *Attorney, Agent, or Firm* — Harness, Dickey &
Pierce, P.L.C.

(57) ABSTRACT

A pump light generation unit of an optical amplifier pump-
ing device outputs pump light with a single wavelength or a
plurality of wavelengths from a plurality of output ports. A
pump light multiplexing unit polarization-multiplexes or
wavelength-multiplexes the plurality of pieces of pump light
which has been output from the pump light generation unit.
A polarization scrambler collectively polarization-scrambles
the polarization-multiplexed or wavelength-multiplexed
pump light which has been output from the pump light
multiplexing unit and outputs the polarization-scrambled
pump light to an optical waveguide for pump light. The
optical waveguide for pump light inputs the pump light
which has been polarization-multiplexed or wavelength-
multiplexed by the pump light multiplexing unit to the pump
light superimposition unit. A pump light superimposition
unit multiplexes the polarization-multiplexed or wave-
length-multiplexed pump light and signal light. A pump light
output port superimposes the pump light on the signal light (Continued)

by outputting the pump light from the pump light superimposition unit to the gain medium so that the pump light propagates in the same direction as the signal light.

7 Claims, 8 Drawing Sheets

(51) Int. Cl.
 *H01S 3/067*     (2006.01)
 *H01S 3/30*     (2006.01)
(52) U.S. Cl.
 CPC .. *H01S 3/094053* (2013.01); *H01S 3/094076*
     (2013.01); *H01S 3/302* (2013.01)
(58) Field of Classification Search
 CPC ........... H01S 3/094073; H01S 3/09415; H01S
     3/09408; G02B 27/283; G02F 1/35
 See application file for complete search history.

(56)        References Cited

U.S. PATENT DOCUMENTS

| | | | |
|---|---|---|---|
| 2003/0161638 A1 | 8/2003 | Fujiwara et al. | |
| 2005/0220457 A1* | 10/2005 | Fujiwara ............ | H04B 10/2572 |
| | | | 398/186 |
| 2010/0166426 A1 | 7/2010 | Watanabe | |

FOREIGN PATENT DOCUMENTS

| | | | |
|---|---|---|---|
| JP | 2010-152169 A | 7/2010 | |
| JP | 5788814 B2 | 10/2015 | |
| JP | 2016-506075 A | 2/2016 | |
| WO | WO-2014/096292 A1 | 6/2014 | |

* cited by examiner

Figure 1:
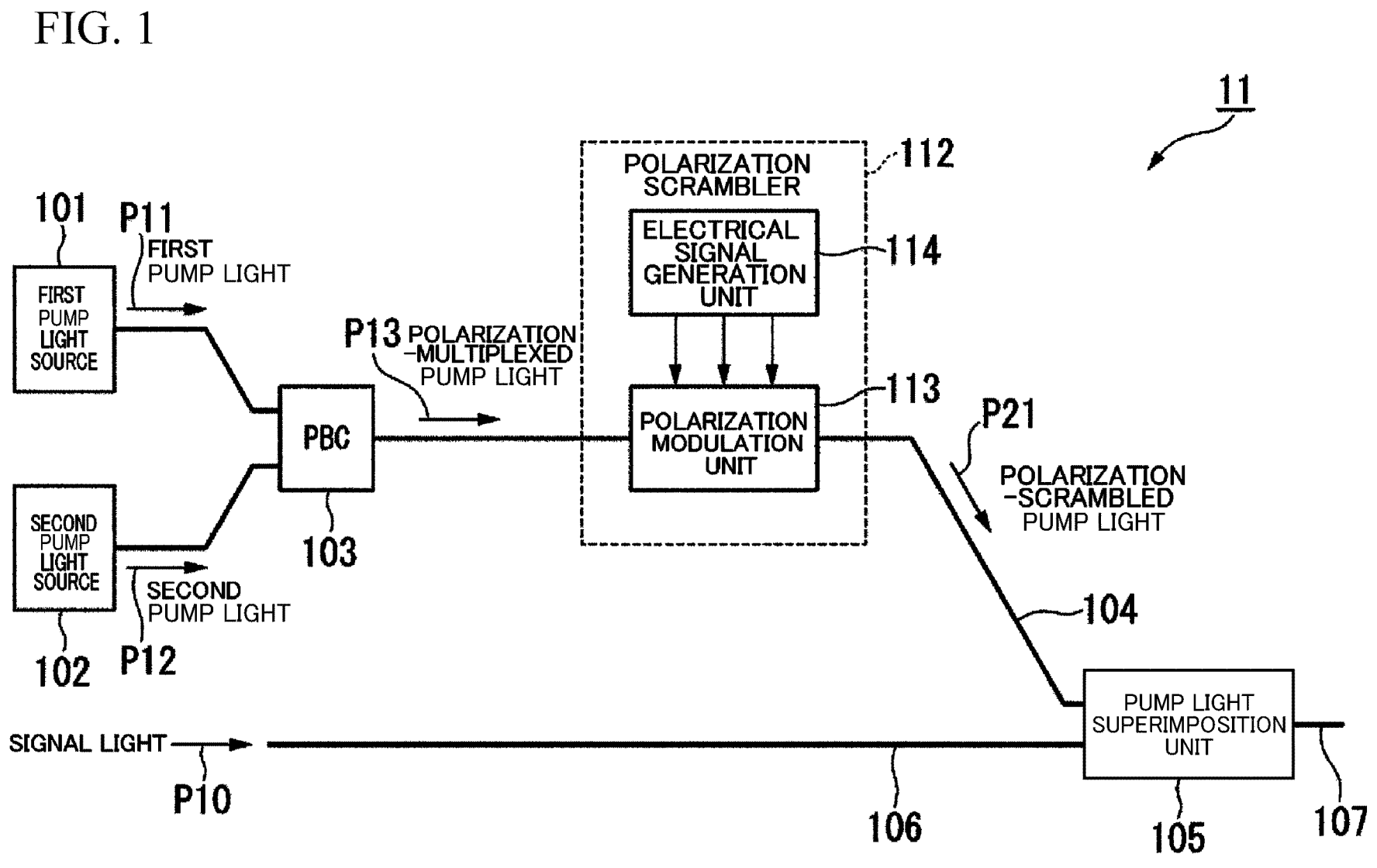

101 — FIRST PUMP LIGHT SOURCE

P11 FIRST PUMP LIGHT

102 — SECOND PUMP LIGHT SOURCE

P12 SECOND PUMP LIGHT

PBC — 103

P13 POLARIZATION-MULTIPLEXED PUMP LIGHT

POLARIZATION SCRAMBLER — 112

ELECTRICAL SIGNAL GENERATION UNIT — 114

POLARIZATION MODULATION UNIT — 113

P21 POLARIZATION-SCRAMBLED PUMP LIGHT

104

PUMP LIGHT SUPERIMPOSITION UNIT — 105

107

106

P10 SIGNAL LIGHT

EXCITATION DEVICE FOR OPTICAL AMPLIFIER

CROSS-REFERENCE TO RELATED APPLICATIONS

This application is a 371 U.S. National Phase of International Application No. PCT/JP2020/031993, filed on Aug. 25, 2020. The entire disclosure of the above application is incorporated herein by reference.

TECHNICAL FIELD

The present invention relates to an excitation device for optical amplifier.

BACKGROUND ART

In design of high-speed and large-capacity optical transmission systems, it is important to reduce deterioration in signal noise (SN) of received signals caused due to losses of transmission lines. Therefore, various configurations for compensating for losses of transmission lines by performing optical amplification in repeaters or in optical transmission lines themselves have been devised. In particular, optical amplifiers using erbium-doped fibers as gain medium have become widespread for their simplicity. On the other hand, since a Raman amplifier using the Raman effect can realize a broad gain band, adaptation to a wavelength multiplex transmission scheme is being actively attempted. In particular, since distributed Raman amplification in which the optical fiber transmission lines themselves are utilized as medium has a great advantage that laid optical fibers can be utilized as medium, application to next-generation high-speed and large-capacity optical communication is expected.

FIG. 4 is a diagram illustrating a configuration of an optical transmission system 1 using distributed Raman amplification. In FIG. 4, bidirectional pumping is assumed. An optical transmission line 2 is pumped by forward pump light P1 output by a forward pumping unit 3 and is pumped by other pump light P2 output by a backward pumping unit 4.

An optical transmitter 5 transmits signal light P3. In the case of Raman amplification, a wavelength of pump light is shorter than a wavelength of signal light by about 0.1 μm. Normally, pump light propagates through the core of the optical transmission line 2 similarly to signal light. Therefore, the forward pumping unit 3 is required to multiplex the pump light P1 traveling in the same direction as the signal light P3 with the signal light P3. On the other hand, the backward pumping unit 4 is required to transmit the pump light P2 traveling in the opposite direction to the signal light P3 and to demultiplex only signal light P4 and transmit the signal light P4 to an optical receiver 6. This multiplexing and demultiplexing can be realized by a wavelength multiplexing coupler or circulator.

While the bidirectional pumping has been described in FIG. 4, the direction of pumping may be only forward or only backward. The optical transmission system 1 may include a plurality of forward pumping units 3 and may include a plurality of backward pumping units 4. Further, by doping erbium ions into a part or all of the optical transmission line 2 and remotely pumping the erbium ions with the forward pumping unit 3 and the backward pumping unit 4, it is also possible to simultaneously generate a gain derived from amplification other than the distributed Raman amplification.

Here, Raman amplification is an optical effect that has polarization dependence. Therefore, when pump light has single polarization, a gain received by signal light causes polarization dependence. In other words, optical power at the output of the optical transmission line depends on the state of the polarization at a time point at which signal light is launching to the optical transmission line. A variation width of the gain is referred to as a polarization dependent gain (PDG). A PDG becomes apparent particularly in a configuration of only forward pumping. In backward pumping, polarization variation considerably differs in an optical transmission line due to a difference in a traveling direction between the signal light and the pump light. Therefore, the PDG is less than in the forward pumping. However, some means is required to completely suppress the PDG.

In order to perform stable optical transmission in an optical transmission system using distributed Raman amplification, it is very important to suppress the PDG. A plurality of schemes for suppressing the PDG have already been proposed. How the polarization of the pump light is determined will be briefly described before describing the schemes.

It is assumed that pump light has a single wavelength and has high coherence. Two orthogonal axes X and Y are taken on a plane orthogonal to a traveling direction of the pump. Any directions of the axes can be used. When an optical electric field of the pump light is decomposed in the X and Y directions, two sine waves are obtained. Frequencies of the two sine waves are determined in accordance with a wavelength of the pump light. However, the amplitudes and phases of the two sine waves are generally not the same.

When the phases of the two sine waves are the same or reverse, the pump light becomes a linearly polarized light. In the case of linear polarization, the amplitudes of the two sine waves are not generally equal, and the amplitude of one of the sine waves becomes 0 depending on a direction of the orthogonal axes X and Y. This is because in the case of linear polarization, the optical electric field vibrates within a specific plane (a plane of polarization).

On the other hand, when the phases of the two sine waves are shifted by 90 degrees and the amplitudes of the two sine waves are equal regardless of how the orthogonal axes X and Y are selected, the pump light becomes a circularly polarized wave.

As a pump light source that generates pump light, a laser is used in many cases. A polarized wave immediately after output of the pump light source is generally a linearly polarized. When the pump light is a linearly polarized, a Raman gain is not generated on a plane orthogonal to a plane of polarization of the pump light. Therefore, the PDG of Raman amplification becomes extremely large.

In reality, while the pump light propagates along the optical transmission line, polarization variation occurs due to slight stress or a change in temperature. Therefore, the pump light cannot substantially maintain the linear polarization at all the portions of the optical transmission line. However, when the linear polarization and other polarization states are randomly shifted during the propagation, a PDG which cannot be ignored may be generated, and an undesirable state in which the magnitude of the PDG changes every moment may occur.

In order to avoid this problem, a forward pumping device for Raman amplification of the related art has, for example, a configuration illustrated in FIG. 5. A forward pumping device 91 illustrated in FIG. 5 is used as, for example, the forward pumping unit 3 in FIG. 4. First pump light P11 output from the first pump light source 101 and second pump light P12 output from the second pump light source 102 are polarization-multiplexed by a polarization beam combiner (PBC) 103. As described above, the first pump light immediately after output from the first pump light source 101 and the second pump light P12 immediately after output from the second pump light source 102 are both linearly polarized. The first pump light P11 and the second pump light P12 are polarization-multiplexed by the PBC 103, and the polarization-multiplexed pump light P13 is input to a pump light superimposition unit 105 via an optical waveguide for pump light 104.

On the other hand, a signal light P10 is input to the pump light superimposition unit 105 via an optical waveguide for signal light 106. The pump light superimposition unit 105 can be realized by a wavelength multiplexing coupler. The pump light superimposition unit 105 wavelength-multiplexes the signal light P10 and the polarization-multiplexed pump light P13. Signal light P15 wavelength-multiplexed by the pump light superimposition unit 105 is output from a pump light output port 107 and is transmitted to an optical transmission line (for example, an optical transmission line 2 illustrated in FIG. 4).

A relationship between the polarization of the signal light and the polarization of the pump light combined by the forward pumping device 91 illustrated in FIG. 5 is conceivable. In recent optical transmission systems, in order to improve frequency utilization efficiency, signal light is polarization-multiplexed in many cases. Therefore, signal light is polarization-multiplexed in the description of the present specification.

States of the polarization of the polarization-multiplexed two signal light are located at opposite positions across the center of the Poincare sphere. However, the latitude and longitude change due to polarization variation during propagation through an optical waveguide. There can be a pair of linearly polarized waves of which polarization planes are orthogonal to each other (two points on the equator of the Poincare sphere), and there can be a pair of clockwise and counterclockwise circularly polarized waves (two points of the north and south poles of the Poincare sphere). However, to facilitate description, it is assumed that two pieces of polarization-multiplexed signal light are not subjected to polarization variation and are a pair of linearly polarized waves of which polarization planes are orthogonal to each other as in the case immediately after the output of the optical transmitter.

FIG. 6 is a diagram showing examples of polarized states of signal light. In FIG. 6(a), the polarization-multiplexed signal light P10 is assumed to be signal light x and signal light y, and orthogonal coordinate axes of a plane orthogonal to the traveling direction of the signal light P10 are assumed to be $X_S$ and $Y_S$. Here, $X_S$ and $Y_S$ are selected to coincide with the polarization planes of the signal light X and the signal light Y, respectively.

FIG. 6(b) shows the first pump light P11 and the second pump light P12 illustrated in FIG. 5 similarly to FIG. 6(a). Orthogonal coordinate axes of a plane orthogonal to the traveling direction of the pump light are defined as $X_P$ and $Y_P$. In FIG. 6(b), $X_P$ and $Y_P$ are selected to coincide with the polarization planes of the first pump light P11 and the second pump light P12, respectively.

It should be noted here that, unlike the first pump light P11 and the second pump light P12, the signal light x and the signal light y are independently modulated as transmission signals, so then their coherencies are low. Therefore, mutual interference between the signal light x and the signal light y can be generally ignored.

On the other hand, unmodulated light is usually used as the first pump light P11 and the second pump light P12. When the first pump light P11 and the second pump light P12 have the completely same optical wavelength and have high coherency, these two pump light interfere with each other after polarization-multiplexing, and thus a single polarized wave state is generated.

For example, when the first pump light P11 and the second pump light P12 are polarization-multiplexed with an optical phase difference of 90 degrees, a circular polarization as illustrated in the combined pump light #1 of FIG. 6(c) is generated. When the combined pump light #1 is decomposed in the $X_P$ and $Y_P$ directions, sine waves with the same amplitude are obtained. When the coordinate axes $X_P$ and $Y_P$ are rotated by any angle, the amplitudes of the decomposed sine waves are the same. Therefore, the Raman gain generated from the combined pump light #1 is isotropic, and the signal light x and the signal light y receive the same Raman gain. In this case, the PDG is suppressed.

Next, a case in which the first pump light P11 and the second pump light P12 are polarization-multiplexed in a state in which an optical phase difference is 0 degrees (the same phase) will be considered. In this case, a linear polarization is generated as illustrated by the combined pump light #2 in FIG. 6(d). Here, when the coordinate axes $X_P$ and $Y_P$ and the coordinate axes $X_S$ and $Y_S$ are in the same direction and the combined pump light #2 is decomposed in each coordinate axis direction, sine waves with the same amplitude can be obtained. Therefore, the signal light x and the signal light y receive the same Raman gain. In this case, the PDG is suppressed.

In reality, the polarized state of the combined pump light irregularly varies due to slight fluctuation of the optical phase of each piece of pump light and expansion caused by a change in temperature of an input port of the PBC 103. It is not general for the coordinate axes $X_P$ and $Y_P$ and the coordinate axes $X_S$ and $Y_S$ to be considered to be the same. This problem will be described again as a task to be solved according to the present invention.

As another configuration of the related art for suppressing the PDG of distributed Raman amplification in an optical transmission line, a plurality of configurations using incoherent pump light have been proposed. Since incoherent light has no consistency in an optical electric field and various kinds of amplitudes and phases are combined, an unpolarized state in which a state of the polarization cannot be defined is obtained. Therefore, the signal light x and the signal light y receive equal gains, and the PDG of distributed Raman amplification can be suppressed.

To generate incoherent pump light, there is a method of utilizing a light source of spontaneous emission light or a broad continuous spectrum close to the spontaneous emission light (for example, see NPL 1). Alternatively, there is also a method of artificially deteriorating coherence of the pump light in combination of a laser and a depolarizer.

FIG. 7 is a diagram showing a configuration of a forward pumping device 92 of the related in which a depolarizer is used. While there are a plurality of depolarizer configurations, a configuration described in NPL 1 will be described here. A two-input depolarizer 119 includes a first polarization maintaining coupler 108, a polarization maintaining delay unit 109, an orthogonal connector 110, and a second polarization maintaining coupler 111. Here, it is assumed that the first polarization maintaining coupler 108 and the second polarization maintaining coupler 111 are constituted by a panda fiber.

First pump light P11 with linear polarization output from the first pump light source 101 and second pump light P12 with linear polarization output from the second pump light source 102 are input to two input ports in1 and in2 of the first polarization maintaining coupler 108, respectively. Here, the polarization planes of the two linearly polarized waves are input to coincide with the slow and fast axes of a panda fiber, respectively. With this configuration, the first pump light P11 and the second pump light P12 are polarization-multiplexed inside the first polarization maintaining coupler 108.

One of the two output ports of the first polarization maintaining coupler 108 is connected to the polarization maintaining delay unit 109. The polarization maintaining delay unit 109 delays the first pump light P11 and the second pump light P12 in a polarization-multiplexed state. Here, it is desirable for the delay time to be sufficiently longer than the coherence time of the first pump light P11 and the second pump light P12. The output of the polarization maintaining delay unit 109 is input to one of the two input ports of the second polarization maintaining coupler 111 via the orthogonal connector 110. The orthogonal connector 110 connects both the fast axis of the polarization maintaining delay unit 109 and the slow axis of the second polarization maintaining coupler 111 so that these axes are switched.

The other of the two output ports of the first polarization maintaining coupler 108 is directly connected to the other of the two input ports of the second polarization maintaining coupler 111 without involving a delay unit. With this configuration, inside the second polarization maintaining coupler 111, the first pump light is polarization-multiplexed with itself and the second pump light is polarization-multiplexed with itself. In this way, the pump light polarization-multiplexed by the first polarization maintaining coupler 108 is depolarized. The second polarization maintaining coupler 111 outputs the depolarized pump light P14 to the optical waveguide for pump light 104.

Even if the coherence of the pump light is high, if the delay time is sufficiently longer than the coherence time, the optical phase correlation between the pump light and the same pump light that has passed after the delay time becomes very low. Therefore, at the output port of the second polarization maintaining coupler 111, each piece of pump light is depolarized.

To avoid mutual interference inside the two-input depolarizer 119, it is desirable that the wavelengths of the first pump light and the second pump light do not coincide with each other. By taking such a wavelength deployment, there is the advantage that a band of Raman gain can be expanded.

Further, the first pump light source 101 or the second pump light source 102 can be omitted, and only a single pump light source output may be depolarized. FIG. 8 illustrates such a configuration. In this case, a one-input depolarizer 120 is used instead of the two-input depolarizer 119 illustrated in FIG. 7. The configuration of the one-input depolarizer 120 is substantially the same as that of the two-input depolarizer 119. Here, the first polarization maintaining coupler 108 has one input and two outputs, and in2 is not used.

CITATION LIST

Patent Literature

[PTL 1] Japanese Patent No. 5788814

Non Patent Literature

[NPL 1] T. Kobayashi, et al., "PDM-16QAM WDM Transmission with 2nd-Order Forward-Pumped Distributed Raman Amplification Utilizing Incoherent Pumping," Optical Fiber Communications Conference and Exhibition (OFC), Tu3F. 6 (2019).

SUMMARY OF INVENTION

Technical Problem

However, the above-described configuration of the related art has the following problems.

First, a configuration of the related art for polarization-multiplexing pump light illustrated in FIG. 5 will be considered.

The polarized state of light propagating along the optical transmission line constantly varies with slight anisotropy in the core and stress from the outside. However, since the wavelengths of the pump light and the signal light are completely different in Raman amplification, the polarization variation in the optical transmission line is also different.

It is assumed that the polarized state of the combined pump light is a linear polarization as illustrated in FIG. 6(d) at a certain portion of the optical transmission line. At this time, in the direction orthogonal to this polarization plane has no Raman gain (indicated by a dashed line in a drawing).

As described above, the coordinate axes $X_P$ and $Y_P$ illustrated in FIG. 6 generally not coincide with the coordinate axes $X_S$ and $Y_S$. When these axes are inclined by 45 degrees with respect to each other, one of the signal light x and the signal light y receives a large Raman gain and the other receives no Raman gain. In addition, an undesirable state in which a large PDG can occur and the magnitude of the PDG can change every moment occurs.

Next, a configuration of the related art in which a light source of spontaneous emission light or a broad and continuous spectrum close to the spontaneous emission light is used as the pump light will be considered. Since such a light source generally has low light intensity, it is necessary to further use an optical amplification system for only pump light in order to guarantee the intensity necessary for Raman amplification (for example, see NPL 1). Thus, there is a problem that a device configuration is large-scaled and complicated.

Finally, a configuration of the related art in FIG. 7 or 8 in which a laser is used as a pump light source and an unpolarized state is achieved by a depolarizer will be considered. In this configuration, since a delay amount of the polarization maintaining delay unit in the depolarizer is required to be longer than a coherence time of the light source, a polarization maintaining fiber that has a length of several meters to several hundred meters has to be used depending on a case. The polarization maintaining fiber is wound around a bobbin and accommodated in the pumping unit. However, when the radius of the bobbin is reduced, an optical loss of the polarization maintaining fiber increases, which leads to an increase in the size of the apparatus.

In view of the foregoing circumstances, an objective of the present invention is to provide a pumping device for optical amplifier capable of performing stable distributed Raman amplification with a relatively small-sized device configuration.

Solution to Problem

According to an aspect of the present invention, a pumping device for optical amplifier (an excitation device for optical amplifier) for forward or backward pumping of a gain medium includes: a pump light generation unit (hereinafter also referred to as "excitation light generator") configured to simultaneously output pump light with a single wavelength or a plurality of wavelengths from a plurality of output ports; a pump light multiplexing unit (hereinafter also referred to as "excitation light multiplexer") configured to polarization-multiplex or wavelength-multiplex the plurality of pieces of pump light which have been output from the pump light generation unit; a pump light superimposition unit (hereinafter also referred to as "excitation light superimposer") configured, in the case of forward pumping, to multiplex the polarization-multiplexed or wavelength-multiplexed pump light and signal light and, in the case of backward pumping, to demultiplex the signal light from the signal light in which the polarization-multiplexed or wavelength-multiplexed pump light has been multiplexed; an optical waveguide for pump light configured to input the pump light which has been polarization-multiplexed or wavelength-multiplexed by the pump light multiplexing unit to the pump light superimposition unit; an optical waveguide for signal light configured, in the case of forward pumping, to input the signal light to the pump light superimposition unit and, in the case of backward pumping, to receive the signal light which has been demultiplexed by the pump light superimposition unit; a pump light output port configured, in the case of forward pumping, to superimpose the pump light on the signal light by outputting the pump light from the pump light superimposition unit to the gain medium so that the pump light propagates in the same direction as the signal light and, in the case of backward pumping, to superimpose the pump light on the signal light by outputting the pump light from the pump light superimposition unit to the gain medium so that the pump light propagates in an opposite direction to the signal light; and a polarization scrambler configured to collectively polarization-scramble the polarization-multiplexed or wavelength-multiplexed pump light which has been output from the pump light multiplexing unit and output the polarization-scrambled pump light to the optical waveguide for pump light.

According to another aspect of the present invention, a pumping device for optical amplifier (an excitation device for optical amplifier) for forward or backward pumping of a gain medium includes: a single pump light generation unit (hereinafter also referred to as "excitation light generator") configured to output pump light from a single output port; a pump light superimposition unit (hereinafter also referred to as "excitation light superimposer") configured, in the case of forward pumping, to multiplex the pump light and signal light and, in the case of backward pumping, demultiplex the signal light from the signal light in which the pump light has been multiplexed; an optical waveguide for pump light configured to input the pump light to the pump light superimposition unit; an optical waveguide for signal light configured, in the case of forward pumping, to input the signal light to the pump light superimposition unit and, in the case of backward pumping, to receive the signal light which has been demultiplexed by the pump light superimposition unit; a pump light output port configured, in the case of forward pumping, to superimpose the pump light on the signal light by outputting the pump light from the pump light superimposition unit to the gain medium so that the pump light propagates in the same direction as the signal light and, in the case of backward pumping, to superimpose the pump light on the signal light by outputting the pump light from the pump light superimposition unit to the gain medium so that the pump light propagates in an opposite direction to the signal light; a depolarization unit (hereinafter also referred to as "depolarizer") configured to depolarize the pump light which has been output from the single pump light generation unit; and a polarization scrambler configured to polarization-scramble the depolarized pump light which has been output from the depolarization unit and output the polarization-scrambled pump light to the optical waveguide for pump light.

Advantageous Effects of Invention

According to the present invention, stable optical amplification, in particular, distributed Raman amplification, can be realized by a relatively small-sized device configuration.

BRIEF DESCRIPTION OF DRAWINGS

FIG. 1 is a diagram illustrating a configuration of a forward pumping device according to a first embodiment of the present invention.

FIG. 2 is a diagram illustrating a configuration of a forward pumping device according to a second embodiment.

FIG. 4 is a diagram illustrating a configuration of an optical transmission system.

FIG. 5 is a diagram illustrating a configuration of a forward pumping device of the related art.

FIG. 7 is a diagram illustrating a configuration of a forward pumping device of the related art.

Figure 8:
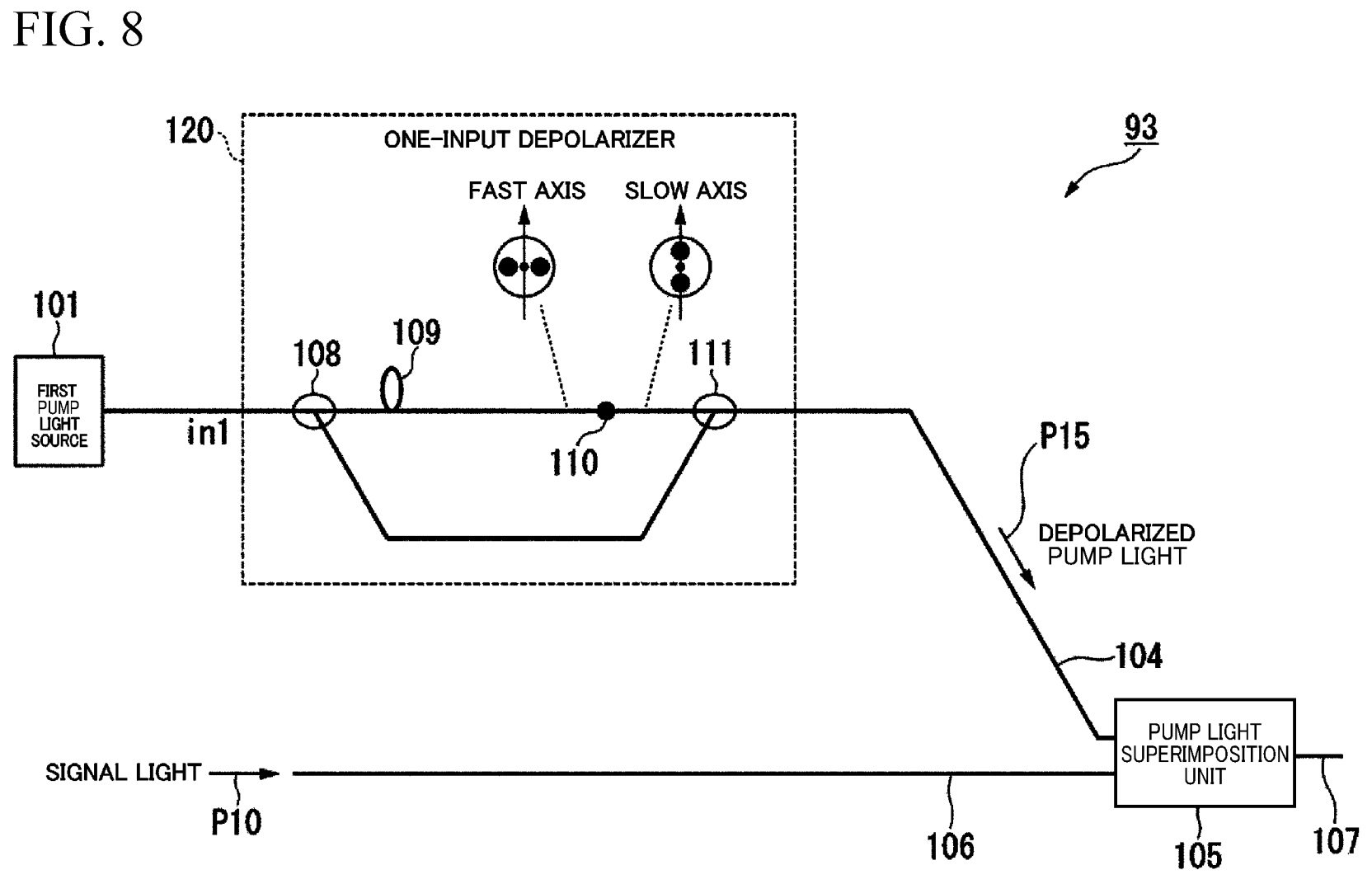

FIG. 8 is a diagram illustrating a configuration of a forward pumping device of the related art.

DESCRIPTION OF EMBODIMENTS

Figure 3:
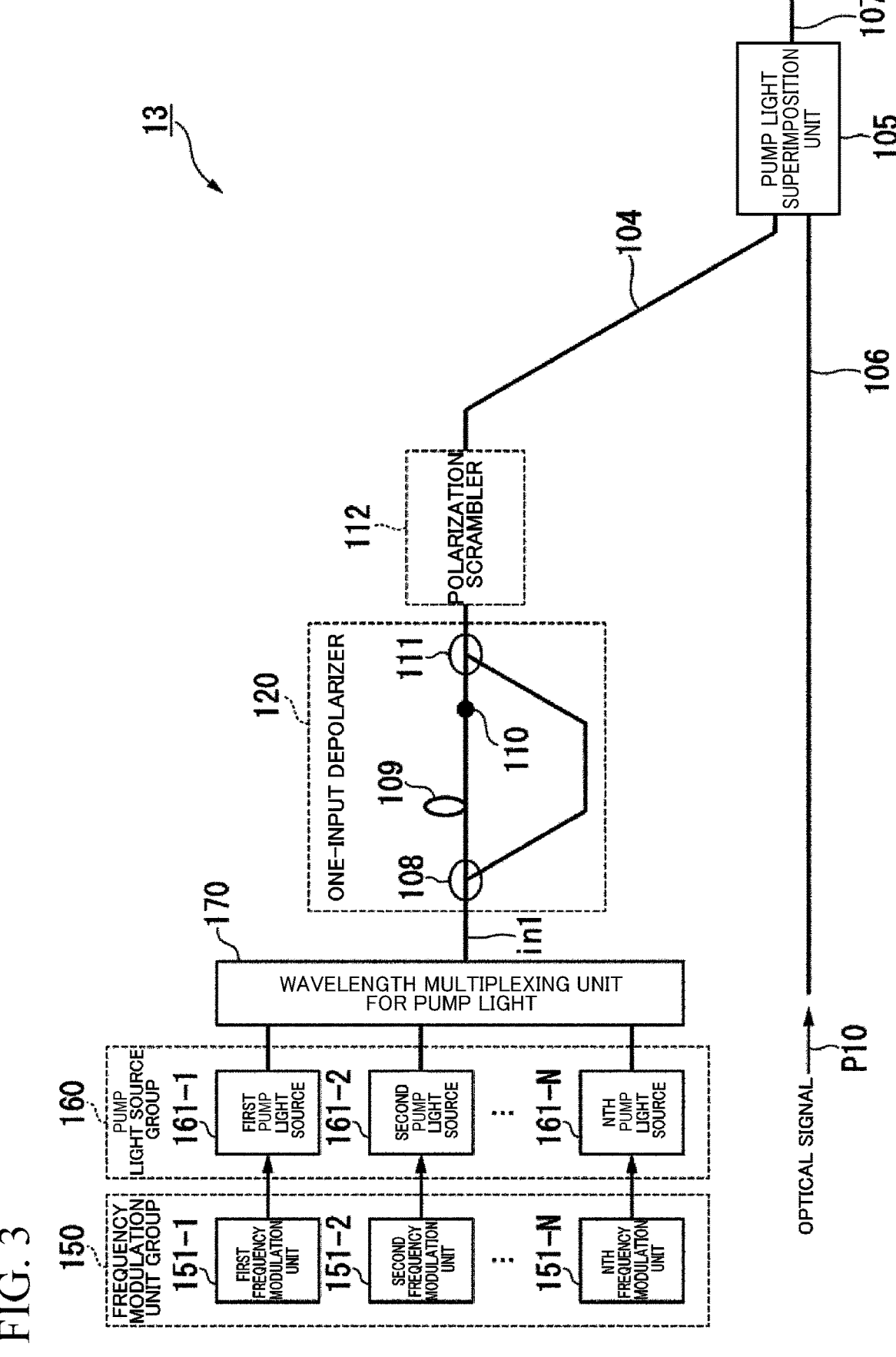
FIG. 3 is a diagram illustrating a configuration of a forward pumping device according to a third embodiment.
Figure 6:
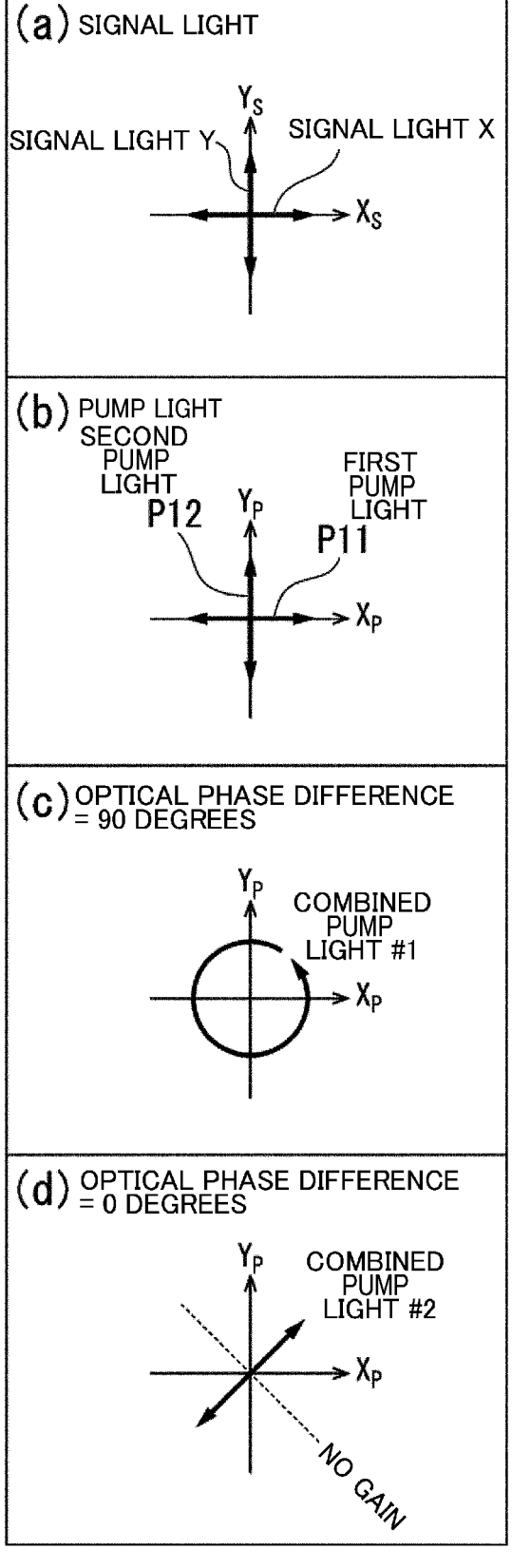
FIG. 6 is a diagram illustrating a polarized state of signal light.

Hereinafter, embodiments of the present invention will be described with reference to the drawings. The present embodiments relate to a pumping device that excites a gain medium in a type of optical amplification system in which a gain has polarization dependence. In particular, the present embodiments are suitable for a pumping device that excites an optical transmission line in an optical transmission system using distributed Raman amplification in which the optical transmission line itself is a gain medium. The embodiments described below are examples of the present invention and the present invention is not limited to the following embodiments. Constituent elements with the same reference signs in the specifications and the drawings are identical to each other.

First Embodiment

FIG. 1 is a diagram illustrating a configuration of a forward pumping device 11 according to a first embodiment. A configuration of an optical transmission system according to the embodiment is similar to that of FIG. 4, for example. In this case, the forward pumping device 11 is used as the forward pumping unit 3 in FIG. 4. The forward pumping device 11 is an example of a pumping device for forward pumping of a gain medium.

The forward pumping device 11 includes a first pump light source 101, a second pump light source 102, a PBC 103, an optical waveguide for pump light 104, a polarization scrambler 112, and a pump light superimposition unit 105. The forward pumping device 11 differs from the forward pumping device 91 of the related art illustrated in FIG. 5 in that the polarization scrambler 112 is disposed between the PBC 103 and the optical waveguide for pump light 104.

The first pump light source 101 outputs first pump light P11 with linear polarization. The second pump source 102 outputs second pump light P12 having linear polarization. The first pump light source 101 and the second pump light source 102 are, for example, laser light sources. A wavelength of the first pump light P11 is the same as a wavelength of the second pump light P12. The PBC 103 polarization-multiplexes the first pump light P11 and the second pump light P12. The PBC 103 outputs polarization-multiplexed pump light P13 to the polarization scrambler 112.

The polarization scrambler 112 includes a polarization modulation unit 113 and an electrical signal generation unit 114. The polarization modulation unit 113 inputs the pump light P13 in which the first pump light P11 and the second pump light P12 are polarization-multiplexed from the PBC 103. The polarization modulation unit 113 is realized by applying stress to, for example, an optical waveguide and minutely changing birefringence. The polarization modulation unit 113 has a function of changing the polarized state of the input light from one certain point of a Poincare sphere to another point. In order to determine a movement direction on the Poincare sphere, it is normally necessary to receive a plurality of control signals from the outside. The electrical signal generation unit 114 collectively scrambles the state of the polarization of the first pump light P11 and the state of the polarization of the second pump light P12 at random by applying a plurality of control signals with long periods to the polarization modulation unit 113. This is realized by a known technique.

Here, differences between a depolarizer and the polarization scrambler 112 will be described. The depolarizer can passively generate an unpolarized state without control from the outside. On the other hand, the polarization scrambler 112 cannot change a state of polarization unless the polarization modulation unit 113 is controlled. Therefore, when input light to the polarization scrambler 112 has a high coherence and the input light is observed in an observation time sufficiently faster than in modulation by a control signal, light output from the polarization modulation unit 113 has a certain state of polarization and is not in an unpolarized state.

In order to achieve the purpose of suppressing PDG, a polarization modulation speed by the polarization modulation unit 113 is preferably high. A sufficient speed cannot be said as a rule because it depends on the configuration of the entire system. As one reference, when a difference between a time Tp required for pump light to propagate through the optical transmission line and a time Ts required for signal light to propagate along the optical transmission line is defined as $\Delta T$, it is desirable to rotate a Poincare sphere one or more within a period of $\Delta T$.

Figure 5:
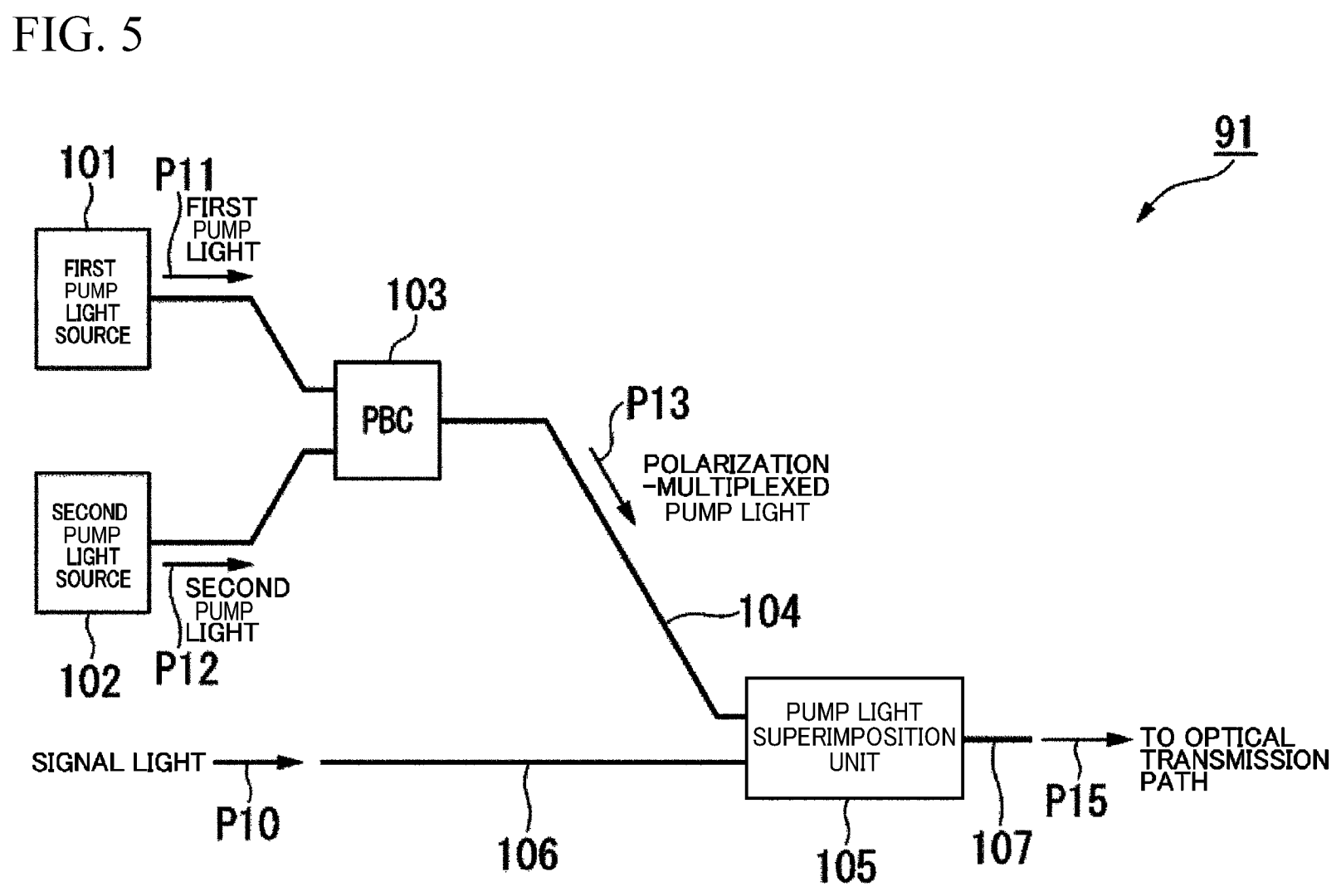

Pump light P21 with two wavelengths polarization-scrambled by the polarization scrambler 112 is input to the pump light superimposition unit 105 through the optical waveguide for pump light 104 as in the example of the related art illustrated in FIG. 5.

The signal light P10 is input to the pump light superimposition unit 105 via the optical waveguide for signal light 106. The pump light superimposition unit 105 wavelength-multiplexes the signal light P10 and the polarization-scrambled pump light P21. The pump light superimposition unit 105 outputs the wavelength-multiplexed signal light from the pump light output port 107. The signal light output from the pump light output port 107 is transmitted to the optical transmission line.

In the case of the commercially available polarization scrambler 112, the upper limit and the lower limit of a wavelength of the input light are often determined as a regulation. Within this regulation, it is necessary to obtain the wavelength of the first pump light source 101 and the wavelength of the second pump light source 102. However, since it is advantageous in expansion of a band of Raman amplification, a slight difference may be made between the wavelength of the first pump light P11 output from the first pump light source 101 and the wavelength of the second pump light P12 output from the second pump light source 102.

Second Embodiment

In the above-described first embodiment, a speed of polarization modulation required for the polarization scrambler 112 is increased. In a configuration of the related art in which depolarization is used, when coherence of pump light is high, it is necessary to lengthen the polarization maintaining delay unit 109. In a second embodiment, by combining a depolarizer and a polarization scrambler, these problems can be simultaneously alleviated. Differences between the present embodiment and the first embodiment will be mainly described.

Figure 2:
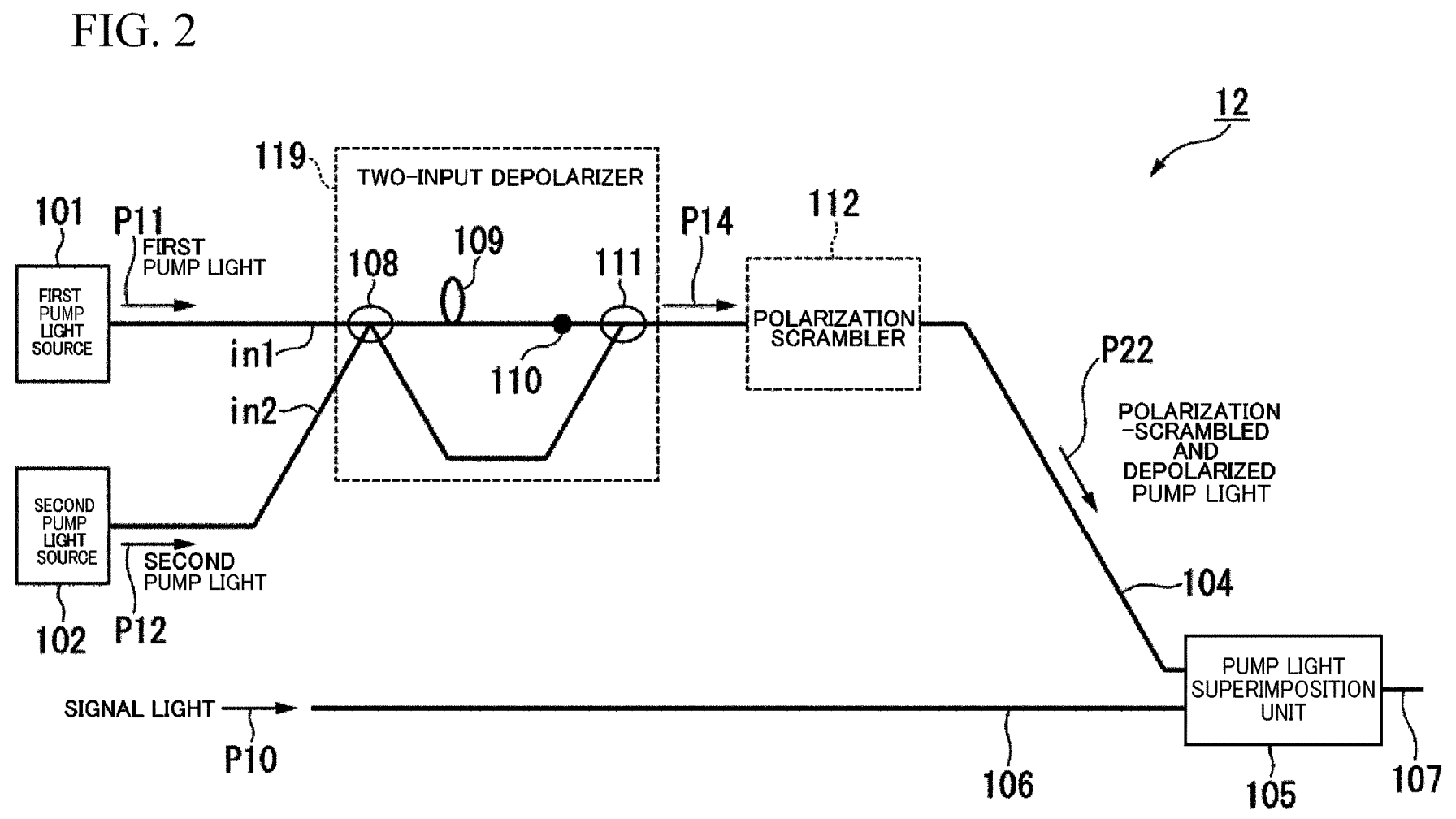

FIG. 2 is a diagram illustrating a configuration of a forward pumping device 12 according to the second embodiment. For example, the forward pumping device 12 is used as the forward pumping unit 3 in FIG. 4. The forward pumping device 12 is an example of a pumping device for forward pumping of a gain medium.

Figure 7:
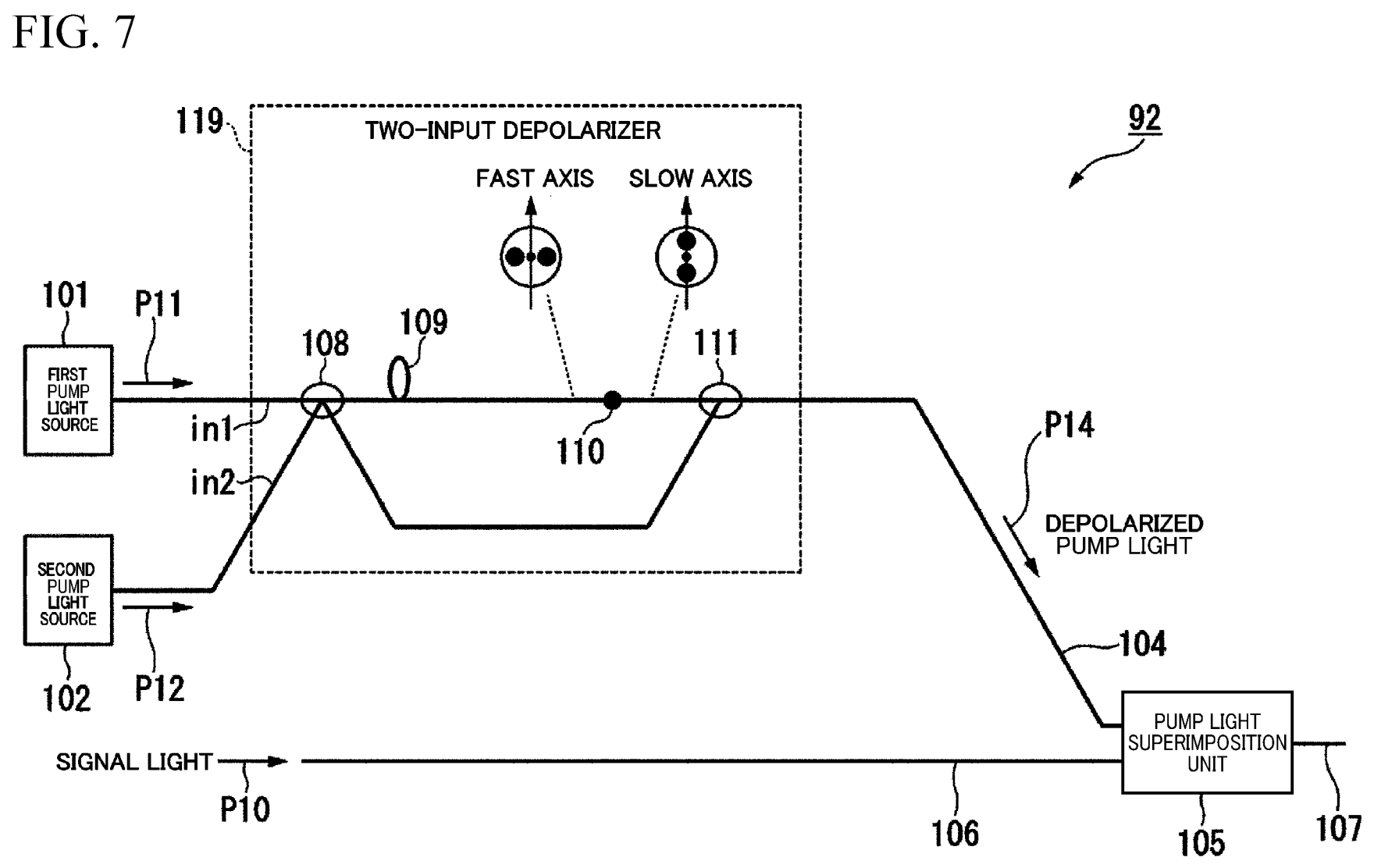

The forward pumping device 12 includes a first pump light source 101, a second pump light source 102, a two-input depolarizer 119, a polarization scrambler 112, an optical waveguide for pump light 104, and a pump light superimposition unit 105. The forward pumping device 12 differs from the forward pumping device 91 of the example of the related art illustrated in FIG. 7 in that the polarization scrambler 112 is added to the rear stage of the two-input depolarizer 119. In the present embodiment, the depolarized first pump light P11 and the second pump light P12 are polarization-scrambled by the polarization scrambler 112 to be input to the optical waveguide for pump light 104.

The two-input depolarizer 119 includes a first polarization maintaining coupler 108, a polarization maintaining delay unit 109, an orthogonal connector 110, and a second polarization maintaining coupler 111. The first polarization maintaining coupler 108 has two input ports in1 and in2 and two output ports. The input port in1 inputs the first pump light P11 output from the first pump light source 101 and the input port in2 inputs the second pump light P12 output from the second pump light source 102. The first polarization maintaining coupler 108 polarization-multiplexes the first pump light P11 and the second pump light P12 and outputs the polarization-multiplexed first pump light P11 and second pump light P12 from the two output ports. An output from one output port of the first polarization maintaining coupler 108 is delayed by the polarization maintaining delay unit 109. The orthogonal connector 110 connects both the fast axis of the polarization maintaining delay unit 109 and the slow axis of the second polarization maintaining coupler 111 to the output of the polarization maintaining delay unit 109 so that these axes are switched.

The other of the two output ports of the first polarization maintaining coupler 108 is directly connected to the other of the two input ports of the second polarization maintaining coupler 111 without involving a delay unit. Inside the second polarization maintaining coupler 111, the first pump light P11 is polarization-multiplexed with itself, and the second pump light P12 is polarization-multiplexed with itself to generate depolarized pump light P14. The second polarization maintaining coupler 111 outputs the depolarized pump light P14.

When the length of the polarization maintaining delay unit 109 inside the two-input depolarizer 119 is insufficient, the depolarization of the pump light P14 becomes insufficient. In order to compensate for this, the forward pumping device 12 drives the polarization scrambler 112 to suppress the PDG. At an input stage of the polarization scrambler 112, depolarization has already been performed to some extent by the two-input depolarizer 119 and coherence deteriorates. Therefore, a required speed of polarization modulation is more alleviated than in the first embodiment. Therefore, by combining different types of devices, it is possible to obtain an effect that is not an effect obtained through simple addition of miniaturization of the device and a reduction in an operation speed.

The polarization scrambler 112 polarization-scrambles the pump light P14 input from the two-input depolarizer 119 and outputs polarization-scrambled and depolarized pump light P22. The pump light P22 outputted from the polarization scrambler 112 is input to the pump light superimposition unit 105 through the optical waveguide for pump light 104, similarly to the first embodiment illustrated in FIG. 1. The signal light P10 is input to the pump light superimposition unit 105 through the optical waveguide for signal light 106. The pump light superimposition unit 105 wavelength-multiplexes the signal light P10 and the pump light P22. The pump light superimposition unit 105 outputs the wavelength-multiplexed signal light from the pump light output port 107. The signal light output from the pump light output port 107 is transmitted to the optical transmission line.

In this embodiment, when a slight difference is made between the wavelength of the first pump light P11 output from the first pump light source 101 and the wavelength of the second pump light P12 output from the second pump light source 102, it is advantageous in expansion of a band of Raman amplification.

Third Embodiment

In the above-described second embodiment, the first pump light and the second pump light have been depolarized collectively and polarization scrambling has been performed collectively. In a third embodiment, N kinds of pump light are depolarized collectively and polarization scrambling is performed collectively. Here, N is an integer equal to or greater than 2. Differences between the present embodiment and the first and second embodiments will be mainly described.

FIG. 3 is a diagram illustrating a configuration of the forward pumping device 13 according to the third embodiment. For example, the forward pumping device 13 is used as the forward pumping unit 3 in FIG. 4. The forward pumping device 13 is an example of a pumping device for forward pumping of the gain medium.

The forward pumping device 13 includes a frequency modulation unit group 150, a pump light source group 160, a wavelength multiplexing unit for pump light 170, a one-input depolarizer 120, a polarization scrambler 112, an optical waveguide for pump light 104, and a pump light superimposition unit 105. One of differences between the forward pumping device 13 and the forward pumping device 12 in the second embodiment illustrated in FIG. 2 is that a one-input depolarizer 120 is used instead of the two-input depolarizer 119. A configuration of the one-input depolarizer 120 is the same as that of the two-input depolarizer 119 illustrated in FIG. 2 except that the first polarization maintaining coupler 108 has one input and two outputs. The pump light input to the one-input depolarizer 120 is wavelength-multiplexed by the wavelength multiplexing unit for pump light 170.

The pump light source group 160 has N pump light sources 161. The pump light source 161 is, for example, a laser light source. In FIG. 3, an n-th (where n is an integer equal to or greater than 1 and equal to or less than N) pump light source 161 is referred to as an n-th pump light source 161-n. The first pump light source 161-1 to the N-th pump light source 161-N output pump light with different wavelengths. The N kinds of pump light output from the pump light source group 160 are wavelength-multiplexed by the wavelength multiplexing unit for pump light 170. The output light from the wavelength multiplexing unit for pump light 170 is branched by the first polarization maintaining coupler 108 included in the one-input depolarizer 120. The branched output light is collectively delayed by the polarization maintaining delay unit 109, and then is polarization-multiplexed with itself which is the other branched output light by the second polarization maintaining coupler 111. The second polarization maintaining coupler 111 outputs the output light depolarized by polarization-multiplexing to the polarization scrambler 112.

The gain band can be expanded by using pump light with a plurality of wavelengths. In addition, the gain spectrum of Raman amplification can be easily flattened by finely adjusting the output power of the first pump light source 161-1 to the N-th pump light source 161-N.

Another difference between the forward pump device 13 of the present embodiment and the forward pump device 12 of the second embodiment is that the forward pump device 13 of the present embodiment uses the frequency modulation unit group 150 performing frequency modulation on each of the N pump light sources 161 of the pump light source group 160. The frequency modulation unit group 150 has N frequency modulation units 151. In FIG. 3, the frequency modulation unit 151 performing frequency modulation of the n-th pump light source 161-n is referred to as the n-th frequency modulation unit 151-n.

When a line width of an optical spectrum of pump light is about a few MHz, induced Brillouin scattering occurs in the optical transmission line, and the intensity of the pump light varies irregularly. In the distributed Raman amplification of forward pumping, since a change in the intensity of the pump light immediately causes an irregular variation of the gain. Therefore, it is important to suppress the induced Brillouin scattering. The induced Brillouin scattering can be suppressed by modulating the pump light and widening the line width.

In the present embodiment, the optical spectrum of the pump light is expanded through the polarization modulation by the polarization scrambler 112, and there is a supplementary effect that induced Brillouin scattering hardly occurs. However, when induced Brillouin scattering occurs despite the use of the polarization scrambler 112, the laser diode currents of the N pump light sources 161 included in the pump light source group 160 are directly modulated by the N frequency modulation units 151 included in the frequency modulation unit group 150 and the line width of the optical spectrum of each piece of pump light is expanded, thereby suppressing the induced Brillouin scattering.

The line width of the optical spectrum after expansion preferably exceeds the gain band (about 50 MHz) of Brillouin scattering. However, since the frequency modulation through direct modulation of the light source also results in a change in the intensity simultaneously, it is necessary to determine the modulation efficiency so that the change in the intensity is sufficiently small.

The pump light output from the polarization scrambler 112 is input to the pump light superimposition unit 105 through the optical waveguide for pump light 104, as in the second embodiment illustrated in FIG. 2.

Variations in Each Embodiment

In each embodiment, the polarization scrambler 112 is disposed at the input of the optical waveguide for pump light 104. However, even in a configuration in which the polarization scrambler 112 is disposed in the optical waveguide for signal light 106 and the signal light P10 is polarization-scrambled, the same effect can be obtained. Alternatively, the plurality of polarization scramblers 112 may be used to perform different polarization-scrambling to each of pump light and the signal light P10.

Two or more pump light sources have been used in the above-described embodiments, but a single pump light source may be used. When a single pump light source is used in the second embodiment, the forward pumping device 12 includes the one-input depolarizer 120 instead of the two-input depolarizer 119.

As described in the above-described embodiments, the distributed Raman amplification is performed in the optical transmission line, but concentrated gain type Raman amplification or for optical amplification other than Raman amplification may be used for excitation.

In each embodiment, the forward pumping device has been described, but a backward pumping device for backward pumping of the gain medium may be used by reversing the traveling direction of the signal light. For example, the backward pumping device is used as the backward pumping unit 4 in FIG. 4. When the backward pumping device is used, a circulator may be used as the pumping light superimposition unit 105 instead of the wavelength multiplexing coupler. The pump light output port 107 outputs pump light output from the pump light superimposition unit 105 to the optical transmission line and superimposes the pump light on signal light transmitted from the optical transmission line in the direction of the optical waveguide for signal light 106. The pump light superimposition unit 105 inputs signal light on which the pump light is superimposed from a transmission line and demultiplexes the pump light from the input signal light. The pump light superimposition unit 105 outputs the signal light from which the pump light is demultiplexed to the optical waveguide for signal light 106.

Figure 4:
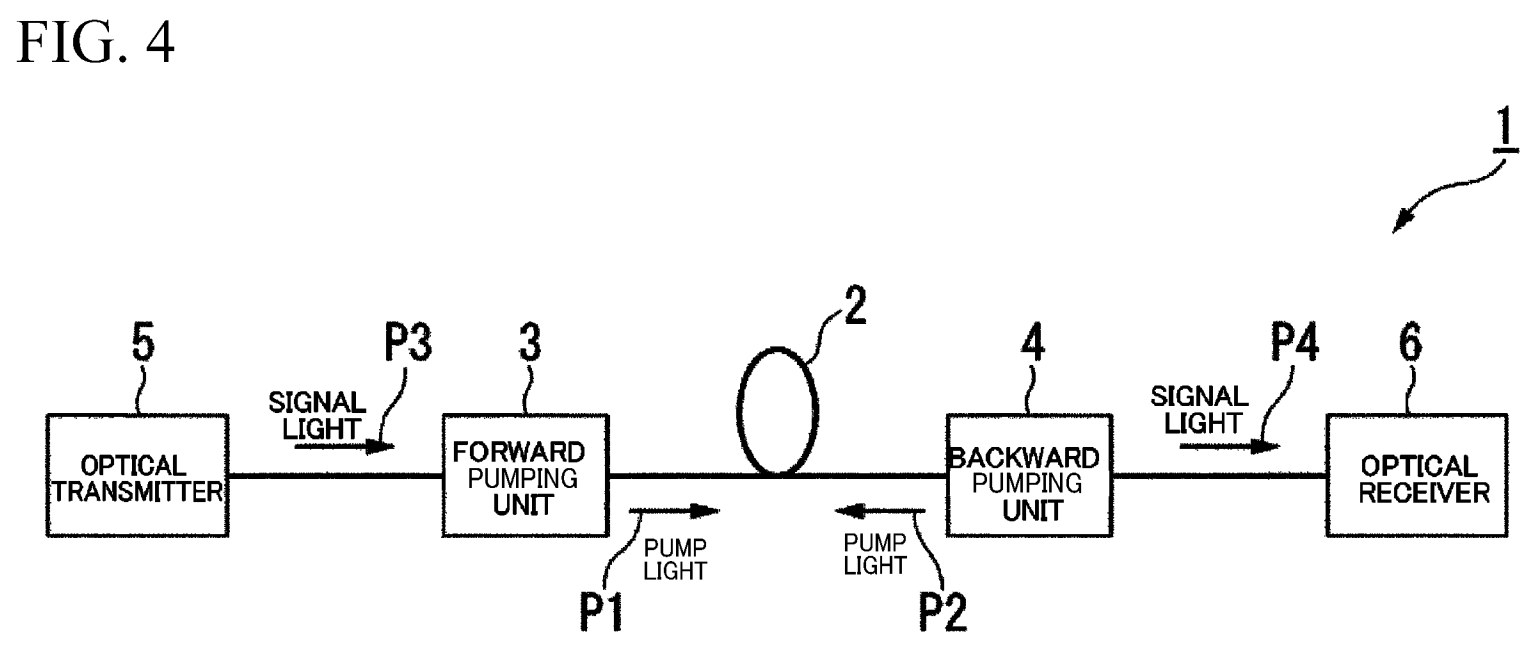

The present embodiment is applied to the optical transmission system 1 illustrated in FIG. 4, but the pump direction of the optical transmission system 1 may be only forward or backward. Further, by doping erbium ions into a part or all of the optical transmission line 2 and remotely pumping the erbium ions with the forward pumping device and the backward pumping device of the above-described embodiment, a gain derived from other than the distributed Raman amplification may be simultaneously generated. That is, the gain medium according to the embodiment is a part or all of the optical transmission line 2.

According to the present embodiment, the optical amplifier pumping device capable of suppressing the PDG in optical amplification, in particular, the PDG in distributed Raman amplification can be realized with a relatively small configuration.

According to the above-described embodiment, a pumping device for optical amplifier for forward or backward pumping of a gain medium includes a pump light generation unit, a pump light multiplexing unit, a pump light superimposition unit, an optical waveguide for pump light, an optical waveguide for signal light, a pump light output port, and a polarization scrambler. The pump light generation unit outputs pump light with a single wavelength or a plurality of wavelengths from a plurality of output ports. The pump light multiplexing unit polarization-multiplexes or wavelength-multiplexes the plurality of pieces of pump light which have been output from the pump light generation unit. The pump light superimposition unit multiplexes the polarization-multiplexed or wavelength-multiplexed pump light and signal light in a forward pumping case and demultiplexes the signal light from the signal light in which the polarization-multiplexed or wavelength-multiplexed pump light has been multiplexed in a backward pumping case. The optical waveguide for pump light inputs the pump light which has been polarization-multiplexed or wavelength-multiplexed by the pump light multiplexing unit to the pump light superimposition unit. The optical waveguide for signal light inputs the signal light to the pump light superimposition unit in the forward pumping case and receives the signal light which has been demultiplexed by the pump light superimposition unit in the backward pumping case. The pump light output port superimposes, in the forward pumping case, the pump light on the signal light by outputting the pump light from the pump light superimposition unit to the gain medium so that the pump light propagates in the same direction as the signal light. The pump light output port superimposes, in the backward pumping case, the pump light on the signal light by outputting the pump light from the pump light superimposition unit to the gain medium so that the pump light propagates in an opposite direction to the signal light. The polarization scrambler collectively polarization-scrambles the polarization-multiplexed or wavelength-multiplexed pump light which has been output from the pump light multiplexing unit and outputs the polarization-scrambled pump light to the optical waveguide for pump light.

Further, according to the above-described embodiment, a pumping device for optical amplifier for forward or backward pumping of a gain medium includes a single pump light generation unit, a pump light superimposition unit, an optical waveguide for pump light, an optical waveguide for signal light, a pump light output port, a depolarization unit, and a polarization scrambler. The single pump light generation unit outputs pump light from a single output port. The pump light superimposition unit multiplexes the pump light and signal light in a forward pumping case and demultiplexes the signal light from the signal light in which the pump light has been multiplexed in a backward pumping case. The optical waveguide for pump light inputs pump light to the pump light superimposition unit. The optical waveguide for signal light inputs the signal light to the pump light superimposition unit in the forward pumping case and receive the signal light which has been demultiplexed by the pump light superimposition unit in the backward pumping case. The pump light output port superimposes, in the forward pumping case, the pump light on the signal light by outputting the pump light from the pump light superimposition unit to the gain medium so that the pump light propagates in the same direction as the signal light. The pump light output port superimposes, in the backward pumping case, the pump light on the signal light by outputting the pump light from the pump light superimposition unit to the gain medium so that the pump light propagates in an opposite direction to the signal light. The depolarization unit depolarizes the pump light which has been output from the single pump light generation unit. The polarization scrambler polarization-scrambles the depolarized pump light which has been output from the depolarization unit and outputs the polarization-scrambled pump light to the optical waveguide for pump light.

The pumping device for optical amplifier may include a pump light generation unit that simultaneously outputs a plurality pieces of pump light with a single wavelength or a plurality of wavelengths from a plurality of output ports instead of the single pump light generation unit. In this case, the pumping device for optical amplifier may include a pump light multiplexing unit inside the depolarization unit or in an input portion of the depolarization unit. The pump light multiplexing unit polarization-multiplexes or wavelength-multiplexes the plurality of pieces of pump light which have been output from the pump light generation unit. The pump light multiplexing unit provided inside the depolarization unit is, for example, the first polarization maintaining coupler 108 according to the embodiment. The pump light multiplexing unit provided in an input portion of the depolarization unit is, for example, the wavelength multiplexing unit for pump light 170 according to the embodiment.

The single pump light generation unit or the pump light generation unit may include one or more laser light sources. In this case, the pumping device for optical amplifier further include one or more frequency modulation units that expands a line width of an output light spectrum of the one or more laser light sources by directly modulating the one or more laser light sources.

The pumping device may further include a signal light polarization scrambler that scrambles a polarized state of the signal light. The signal light polarization scrambler is connected to the optical waveguide for signal light. The signal light polarization scrambler is, for example, the polarization scrambler 112 disposed in the optical waveguide for signal light 106.

The gain medium for pumping the signal light with the forward or backward pumping light which has been output from the pump unit is a part or all of an optical transmission line.

Although the embodiments of the present invention have been described in detail with reference to the drawings, specific configurations are not limited to these embodiments, and designs and the like within the scope of the present invention without departing from the gist of the present invention are also included.

REFERENCE SIGNS LIST

1 Optical transmission system
2 Optical transmission line
3 Forward pumping unit
4 Backward pumping unit
5 Optical transmitter
6 Optical receiver
11 Forward pumping device
12 Forward pumping device
13 Forward pumping device
91 Forward pumping device
92 Forward pumping device
101 First pump light source 102 Second pump light source
103 PBC
104 Optical waveguide for pump light
105 Pump light superimposition unit
106 Optical waveguide for signal light
107 Pump light output port
108 First polarization maintaining coupler
109 Polarization maintaining delay unit
110 Orthogonal connector
111 Second polarization maintaining coupler
112 Polarization scrambler
113 Polarization modulation unit
114 Electrical signal generation unit
119 Two-input depolarizer
120 One-input depolarizer
150 Frequency modulation unit group
151-1 First frequency modulation unit
151-N Nth frequency modulation unit
160 Pump light source group
161-1 First pump light source
161-N Nth pump light source
170 Wavelength multiplexing unit for pump light

The invention claimed is:

1. A pumping device for optical amplifier for forward or backward pumping of a gain medium, comprising:
   a pump light generator configured to simultaneously output pump light with a single wavelength or a plurality of wavelengths from a plurality of output ports;
   a pump light multiplexer configured to polarization-multiplex or wavelength-multiplex the plurality of pieces of pump light which have been output from the plurality of the output ports of the pump light generator;
   a pump light superimposer configured, in the case of forward pumping, to multiplex the polarization-multiplexed or wavelength-multiplexed pump light and signal light and, in the case of backward pumping, to demultiplex the signal light from the signal light in which the polarization-multiplexed or wavelength-multiplexed pump light has been multiplexed;
   an optical waveguide for pump light configured to input the pump light which has been polarization-multiplexed or wavelength-multiplexed by the pump light multiplexer to the pump light superimposer;
   an optical waveguide for signal light configured, in the case of forward pumping, to input the signal light to the pump light superimposer and, in the case of backward pumping, to receive the signal light which has been demultiplexed by the pump light superimposer;
   a pump light output port configured, in the case of forward pumping, to superimpose the pump light on the signal light by outputting the pump light from the pump light superimposer to the gain medium so that the pump light propagates in the same direction as the signal light and, in the case of backward pumping, to superimpose the pump light on the signal light by outputting the pump light from the pump light superimposer to the gain medium so that the pump light propagates in an opposite direction to the signal light; and
   a polarization scrambler configured to collectively polarization-scramble the polarization-multiplexed or wavelength-multiplexed pump light which has been output from the pump light multiplexer and output the polarization-scrambled pump light to the optical waveguide for pump light.

2. The pumping device for optical amplifier according to claim 1, wherein the pump light generator includes one or more laser light sources, and wherein the pumping device for optical amplifier further comprises one or more frequency modulators configured to expand a line width of an output light spectrum of the one or more laser light sources by directly modulating the one or more laser light sources.

3. The pumping device for optical amplifier according to claim 1, further comprising a signal light polarization scrambler configured to scramble a polarized state of the signal light, wherein the signal light polarization scrambler is connected to the optical waveguide for signal light.

4. The pumping device for optical amplifier according to claim 1, wherein the gain medium is a part or all of an optical transmission line.

5. A pumping device for optical amplifier for forward or backward pumping of a gain medium, comprising:

a pump light generator configured to output at least one piece of pump light from at least one output port;

a pump light superimposer configured, in the case of forward pumping, to multiplex the pump light and signal light and, in the case of backward pumping, to demultiplex the signal light from the signal light in which the pump light has been multiplexed;

an optical waveguide for pump light configured to input the pump light to the pump light superimposer;

an optical waveguide for signal light configured, in the case of forward pumping, to input the signal light to the pump light superimposer and, in the case of backward pumping, to receive the signal light which has been demultiplexed by the pump light superimposer;

a pump light output port configured, in the case of forward pumping, to superimpose the pump light on the signal light by outputting the pump light from the pump light superimposer to the gain medium so that the pump light propagates in the same direction as the signal light and, in the case of backward pumping, to superimpose the pump light on the signal light by outputting the pump light from the pump light superimposer to the gain medium so that the pump light propagates in an opposite direction to the signal light;

a depolarizer configured to depolarize the pump light which has been output from the pump light generator; and a polarization scrambler configured to polarization-scramble the depolarized pump light which has been output from the depolarizer and output the polarization-scrambled pump light to the optical waveguide for pump light.

6. The pumping device for optical amplifier according to claim 5, wherein:

the pump light generator is configured to simultaneously output a plurality pieces of pump light, including the at least one pieces of pump light, with a single wavelength or a plurality of wavelengths from a plurality of output ports including the at least one output port;

the pumping device further comprises a pump light multiplexer configured to polarization-multiplex or wavelength-multiplex, inside the depolarizer or in an input portion of the depolarizer, the plurality of pieces of pump light which have been output from the plurality of the output ports of the pump light generator; and the polarization scrambler collectively polarization-scrambles the polarization-multiplexed or wavelength-multiplexed signal which has been output from the depolarizer and then outputs the polarization-scrambled signal to the optical waveguide for pump light.

7. The pumping device for optical amplifier according to claim 5, wherein the pump light generator includes one or more laser light sources, and wherein the pumping device for optical amplifier further comprises one or more frequency modulators configured to expand a line width of an output light spectrum of one or more the laser light sources by directly modulating the one or more laser light sources.

* * * * *